(12) United States Patent
Luick et al.

(10) Patent No.: US 10,933,496 B2
(45) Date of Patent: Mar. 2, 2021

(54) REPAIR OF CAST IRON BORE INNER DIAMETER SURFACES

(71) Applicant: Caterpillar Inc., Deerfield, IL (US)

(72) Inventors: Kegan Jon Luick, Dunlap, IL (US); Timothy Graham, Golden, MS (US)

(73) Assignee: Caterpillar Inc., Peoria, IL (US)

( * ) Notice: Subject to any disclaimer, the term of this patent is extended or adjusted under 35 U.S.C. 154(b) by 163 days.

(21) Appl. No.: 16/159,992

(22) Filed: Oct. 15, 2018

(65) Prior Publication Data
US 2020/0114478 A1  Apr. 16, 2020

(51) Int. Cl.
*B23P 6/02* (2006.01)
*B23P 6/04* (2006.01)
*F01C 21/10* (2006.01)
*F04C 18/08* (2006.01)

(52) U.S. Cl.
CPC ............ *B23P 6/02* (2013.01); *B23P 6/04* (2013.01); *F01C 21/10* (2013.01); *F04C 18/086* (2013.01); *F04C 2230/80* (2013.01); *F04C 2240/801* (2013.01)

(58) Field of Classification Search
CPC .................................. B23P 6/02; B23P 6/04
USPC ................................... 29/402.09, 402.11
See application file for complete search history.

(56) References Cited

U.S. PATENT DOCUMENTS

| | | | | | |
|---|---|---|---|---|---|
| 1,397,167 A | * | 11/1921 | Hopper | ............. | B23P 6/02 52/514 |
| 1,404,001 A | * | 1/1922 | Barrett | ............. | B23P 6/02 427/142 |
| 2,252,986 A | * | 8/1941 | Scott | ............. | B23P 6/04 29/402.11 |
| 2,369,415 A | * | 2/1945 | Sherman | ............. | B23P 6/04 29/888.06 |
| 2,483,765 A | * | 10/1949 | Hamel | ............. | G04B 29/022 29/898.01 |
| 3,483,825 A | | 12/1969 | Evans | | |
| 3,597,131 A | | 8/1971 | Evans | | |
| 3,838,952 A | | 10/1974 | Futamata et al. | | |
| 4,161,056 A | * | 7/1979 | Dunham | ............. | B23P 6/00 156/94 |
| 4,253,808 A | * | 3/1981 | White | ............. | F04C 2/086 418/126 |
| 6,128,819 A | * | 10/2000 | Bates | ............. | B23P 6/02 29/402.04 |
| 6,615,470 B2 | * | 9/2003 | Corderman | ............. | B22D 19/10 29/402.11 |

(Continued)

FOREIGN PATENT DOCUMENTS

FR  2324905 A1  4/1977
JP  2011064144 A  3/2011

*Primary Examiner* — Christopher M Koehler
(74) *Attorney, Agent, or Firm* — Hibshman Claim Construction PLLC

(57) ABSTRACT

A method for repairing a worn portion in an inner diameter surface of a bore of a cast iron part is disclosed. The inner diameter surface of the bore may have an original surface geometry prior to wear. The method may comprise forming a crescent-shaped pocket in the inner diameter surface of the bore to remove the worn portion, installing an insert in the crescent-shaped pocket, and post-machining the insert to form a crescent-shaped insert that is flush with the original surface geometry of the bore inner surface diameter.

20 Claims, 6 Drawing Sheets

(56) References Cited

U.S. PATENT DOCUMENTS

| | | | |
|---|---|---|---|
| 8,826,534 B2* | 9/2014 | Cappelli | B29C 73/10 29/402.09 |
| 2013/0129939 A1* | 5/2013 | Silk | C23C 4/134 427/569 |
| 2015/0107076 A1* | 4/2015 | Maki | B23P 6/00 29/402.18 |
| 2016/0297039 A1* | 10/2016 | Simpson | B23P 6/02 |

* cited by examiner

REPAIR OF CAST IRON BORE INNER DIAMETER SURFACES

TECHNICAL FIELD

The present disclosure generally relates to repair of cast iron parts and, more specifically, to repair of bore inner diameter surfaces of cast iron parts, such as gear pump housings.

BACKGROUND

Many work machines, such as articulated trucks, wheel loaders, excavators, and off-highway trucks may include cast iron components that may be subject to wear over time. For instance, gear pumps with a cast iron housing may be used in such machines for pumping hydraulic fluid to steering components, or for pumping hydraulic fluid to hydraulic motors or hydraulic cylinders, such as those involved in operating a machine implement. Gear pumps may also be employed for transferring lubrication oil to various engine components. A gear pump may have an inlet where fluid is drawn into the pump, an outlet where pressurized fluid is discharged from the pump, and a gear pocket consisting of side-by-side bores that respectively receive a driving gear mounted on a driving shaft, and a driven gear mounted on a driven shaft. The gear teeth of the driving and driven gears may mesh with each other at a center of the gear pocket, and form a tight clearance with the inner diameter surfaces of the bores at the radially outward edges of the gear pocket. Rotation of the gears causes suction of the fluid into the pump at the inlet, as well as discharge of the pressurized fluid from the pump at the outlet. Specifically, the fluid may be collected between the gear teeth at the inlet, and carried by the gear teeth around the inner diameter surfaces of the bores for discharge of the pressurized fluid at the outlet.

Over time and/or under high pressure conditions, the gear teeth may physically cut into the inner diameter surfaces of the bores of the pump housing, causing radial wear of the bore inner diameter surfaces and increasing the clearance between the gear teeth and the bore inner diameter surfaces. Eventually, the increased clearance may cause leakage of fluid, reduced pressures, and diminished pump performance. In standard gear pumps, the wear along the bore inner diameter surfaces may be relatively uniform around the gear rotation path, whereas in high-pressure gear pumps, wear may be more significant toward the low-pressure inlet side of the housing due to pressure exerted on the gears from the higher pressure outlet side of the housing. More particularly, pressure from the outlet side of the housing may push the gears toward the inlet side of the housing, causing damage to the bore inner diameter surfaces that are near the inlet.

Worn bore inner diameter surfaces of standard gear pump housings may be repaired by thermal spray deposition. However, thermally sprayed repair surfaces may not be able to meet performance criteria for all pumps, such as high-pressure gear pumps. In high-pressure gear pumps, the thermally sprayed surfaces may disbond from the housing under the high-pressure operation conditions. Furthermore, thermally sprayed repair methods may be expensive to implement. Other repair methods, such as welding or cladding, cannot be easily implemented for repair of cast iron parts.

U.S. Pat. No. 4,253,808 describes a wear-resistant insert placed between a housing and gear teeth of a gear pump to reduce the need of replacement or repair of the gear pump housing. The patent does not, however, disclose a method of repair of bore inner diameter surfaces of a gear pump housing that are already worn.

Accordingly, there is a need for improved methods for repairing bore inner diameter surfaces of cast iron parts, such as those of high-pressure gear pump housings.

SUMMARY

In accordance with one aspect of the present disclosure, a method for repairing a worn portion in an inner diameter surface of a bore of a cast iron housing of a high-pressure gear pump is disclosed. The inner diameter surface of the bore may have an original surface geometry prior to wear. The method may comprise forming a crescent-shaped pocket in the inner diameter surface of the bore to remove the worn portion, installing an insert in the crescent-shaped pocket, and post-machining the insert so that an inner diameter surface of the insert corresponds to the original surface geometry of the bore inner diameter surface.

In accordance with another aspect of the present disclosure, a method for repairing a worn portion in an inner diameter surface of a bore of a high-pressure gear pump is disclosed. The bore may be formed in a cast iron housing of the high-pressure gear pump and may be configured to receive a gear. The inner diameter surface of the bore may have an original surface geometry prior to wear. The method may comprise forming a crescent-shaped pocket in the inner diameter surface of the bore to remove the worn portion. The crescent-shaped pocket may span about 90 degrees to about 120 degrees around the inner diameter surface of the bore. The method may further comprise installing an insert in the crescent-shaped pocket, and post-machining the insert into a crescent-shaped insert. The crescent-shaped insert may have an inner diameter surface that corresponds to the original surface geometry of the bore inner diameter surface.

In accordance with another aspect of the present disclosure, a method for repairing a worn portion in and inner diameter surface of a bore of a cast iron part is disclosed. The inner diameter surface of the bore may have an original surface geometry prior to wear. The method may comprise forming a crescent-shaped pocket in the inner diameter surface of the bore to remove the worn portion, installing a half-moon shaped insert in the crescent-shaped pocket, and post-machining the insert to form a crescent-shaped insert that is flush with the original surface geometry of the bore inner diameter surface.

These and other aspects and features of the present disclosure will be more readily understood when read in conjunction with the accompanying drawings.

DETAILED DESCRIPTION

Figure 1:
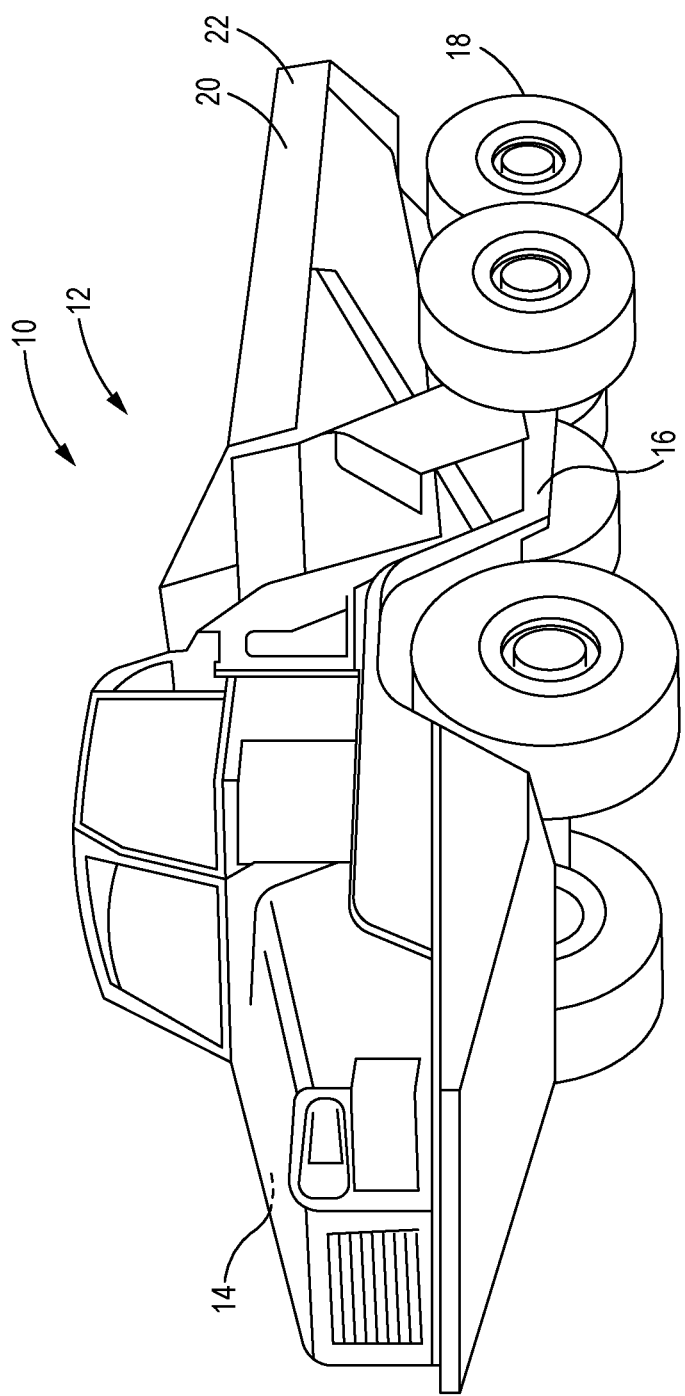
FIG. 1 is a side-view of a machine, constructed in accordance with the present disclosure.

Referring now to the drawings, and with specific reference to FIG. 1, a machine 10 is shown. The machine 10 may be various types of work machines such as, but not limited to, an articulated truck 12, an off-highway truck, a wheel loader, an excavator, a motor grazer, a dozer, as well as various other types of machines used in construction, mining, agriculture, and other such applications. The machine 10 may include a power source 14, such as an internal combustion engine, a frame 16, and ground engagement members 18, such as wheels or tracks. In addition, the machine 10 may include one or more implements 20, such as a dump bed 22, blade, or bucket, configured to articulate between raised and lowered positions. One or more components of the machine 10 may be formed from a cast iron alloy that is subject to wear over time. More particularly, as explained in further detail below, the machine 10 may have cast iron parts with bore inner diameter surfaces that wear down with extended use.

Figure 3:
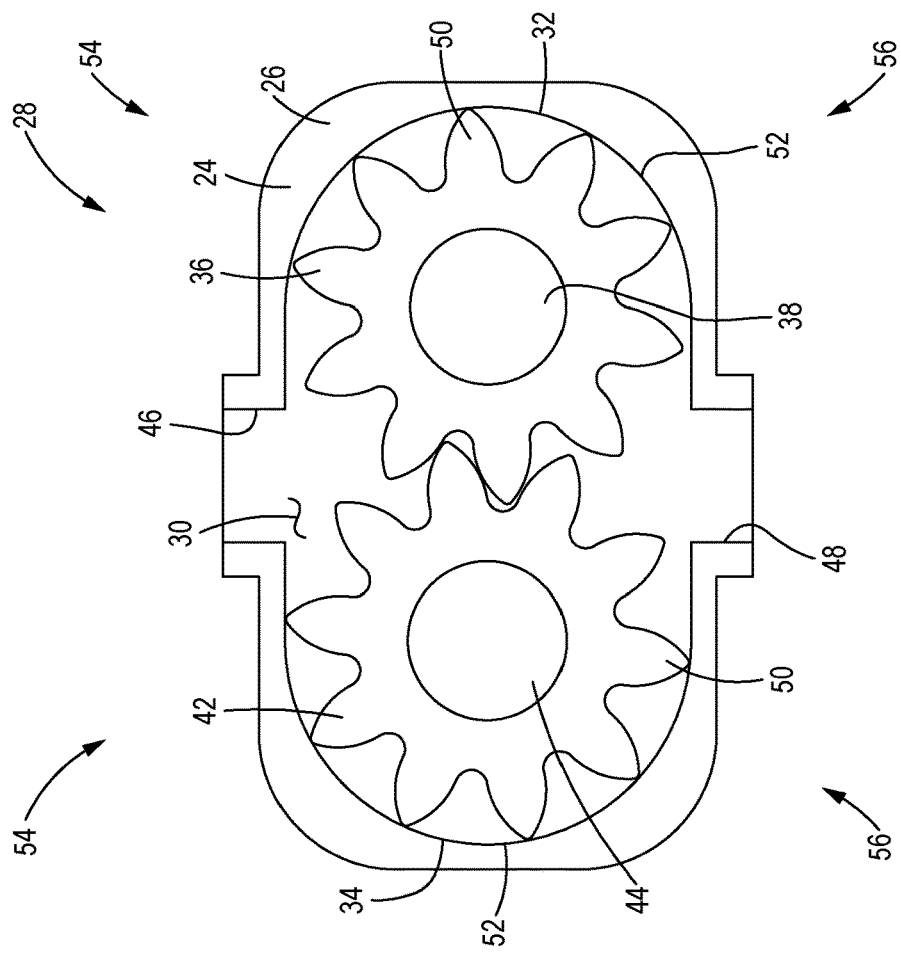
FIG. 3 is a cross-sectional view through the section 3-3 of FIG. 2, constructed in accordance with the present disclosure.
Figure 2:
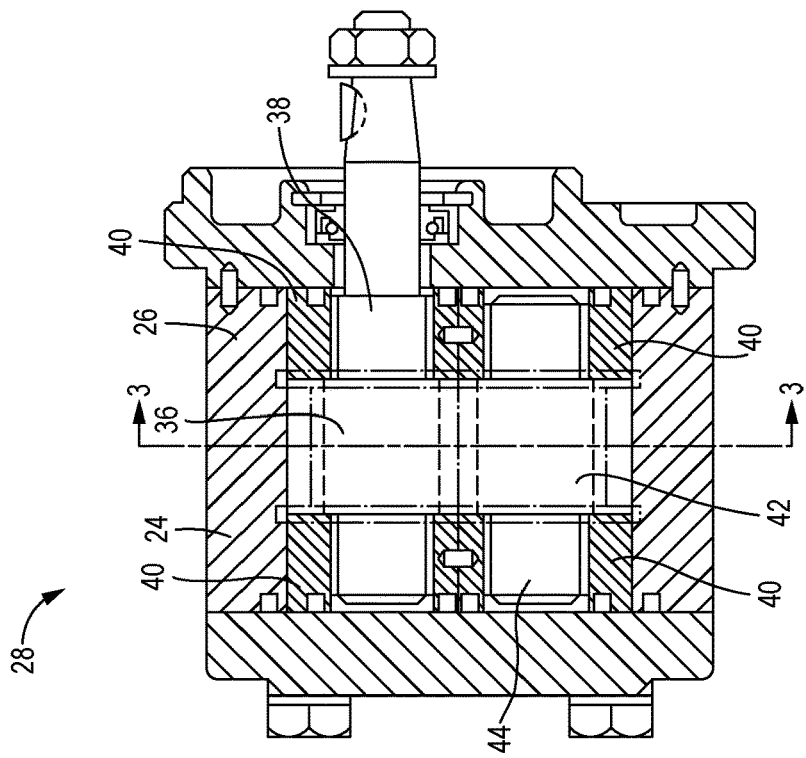
FIG. 2 is a cross-sectional view of a component of the machine having a cast iron part with a bore, constructed in accordance with the present disclosure.

Referring now to FIGS. 2-3, an exemplary cast iron part 24 of the machine 10 having bore inner diameter surfaces that are subject to wear is shown. The exemplary cast iron part 24 of FIGS. 2-3 is a cast iron housing 26 of a high-pressure gear pump 28. However, the repair method disclosed herein may be applicable to various other types of cast iron parts with worn bore inner diameter surfaces. The high-pressure gear pump 28 may be used for various purposes such as, but not limited to, transferring oil from a tank to engine components for lubrication, or transferring pressurized hydraulic fluid for operation of hydraulic systems of the machine 10, such as steering components, or hydraulic motors/cylinders used for operating the implement 20.

The housing 26 of the gear pump 28 may be formed from a cast iron alloy, and may include a gear pocket 30 defined by a first bore 32 and a second bore 34 arranged side-by-side (see FIG. 3). The first bore 32 may receive a first gear 36 mounted on a driving shaft 38, as well as pressure plates 40 that sandwich the first gear 36 (also see FIG. 2). The second bore 34 may receive a second gear 42 mounted on a driven shaft 44, and pressure plates 40 that sandwich the second gear 42. The driving shaft 38 may be rotationally coupled to a power source of the machine 10, such as the engine crankshaft, drivetrain, or electric motor. As shown in FIG. 3, the housing 26 may also include an inlet 46 for drawing in fluid, and an outlet 48 for discharging the fluid after pressurization by the gear pump 28. Although shown between the first and second bores 32 and 34 of the gear pocket 30 in FIG. 3, it will be understood that the inlet 46 and/or the outlet 48 may be asymmetrically disposed about the gear pocket 30, or positioned at other locations around the gear pocket 30.

Referring still to FIG. 3, the first and second gears 36 and 42 may include gear teeth 50 that mesh at the center of the gear pocket 30 between the first and second bores 32 and 34. Additionally, the first and second bores 32 and 34 may have inner diameter surfaces 52 that form tight clearances with the gear teeth 50 as the gears 36 and 42 rotate. In operation of the high-pressure gear pump 28, the rotation of the gears 36 and 42 may draw fluid into the housing 26 via the inlet 46, and the drawn-in fluid may be trapped between the gear teeth 50 and the bore inner diameter surfaces 52 and carried to the outlet 48 by the rotating gear teeth 50. As the gear teeth 50 rotate along the inner diameter surfaces 52 of the bores 32 and 34, the fluid may be pressurized and then released from the gear teeth 50 at the outlet 48. The pressurized fluid may then be discharged from the gear pump housing 26 through the outlet 48 and directed to various targets depending on the application. Notably, with extended use, tips of the gear teeth 50 may physically cut into the bore inner diameter surfaces 52, gradually wearing down the inner diameter surfaces 52 and increasing the clearance between the gear teeth 50 and the inner diameter surfaces 52. The increased clearance may allow leakage of fluid, thereby reducing fluid pressures and the performance of the gear pump 28.

In the high-pressure gear pump 28, the wear of the bore inner diameter surfaces 52 may be more pronounced or only existent at inlet sides 54 of the bores 32 and 34 relative to outlet sides 56 of the bores 32 and 34. As used herein, the inlet sides 54 of the bores 32 and 34 refers to the sides of the bores 32 and 34 that are nearest the gear pump inlet 46, whereas the outlet sides 56 of the bores 32 and 34 refers to the sides of the bores 32 and 34 that are nearest the gear pump outlet 48. Specifically, pressure may be exerted on the gears 36 and 42 from the outlet sides 56 due to higher fluid pressures near the outlet 48, causing the gears 36 and 42 to deflect toward the inlet 46 and cut into the bore inner diameter surfaces 52 at the inlet sides 54 of the bores 32 and 34. The wear may occur over about 90 degrees or more along the inlet sides 54 of the bore inner diameter surfaces 52.

Figure 4:
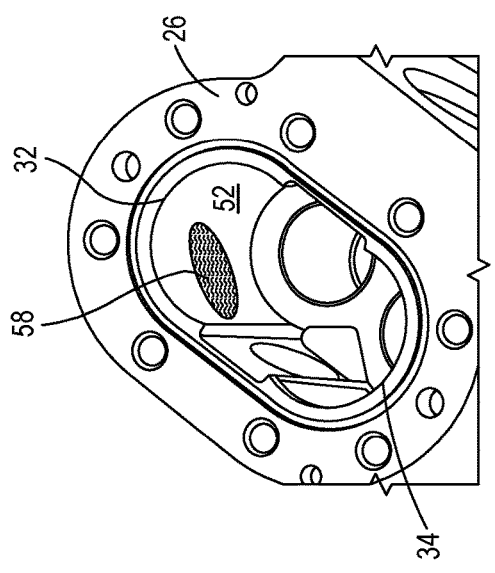
FIG. 4 is a perspective view of the cast iron part shown in isolation and having a worn portion along an inner diameter surface of the bore, constructed in accordance with the present disclosure.

Turning to FIG. 4, the cast iron housing 26 is shown in isolation. In particular, FIG. 4 shows a worn portion 58 at the inlet side 54 of the first bore 32 as may occur with extended use of the gear pump 28. The worn portion 58 may be an abrasion or cut into an original surface geometry of the bore inner diameter surface 52. Although not visible in FIG. 4, a similar worn portion may exist at the inlet side 54 of the second bore 34. A method of repairing the worn portions 58 of the bore inner diameter surfaces 52 is described in detail below with reference to FIGS. 5-7 and 11. The repair method described below may restore the bore inner diameter surfaces 52 to their original surface geometries, thereby restoring pump performance without introducing additional fluid leakage paths.

Figure 5:
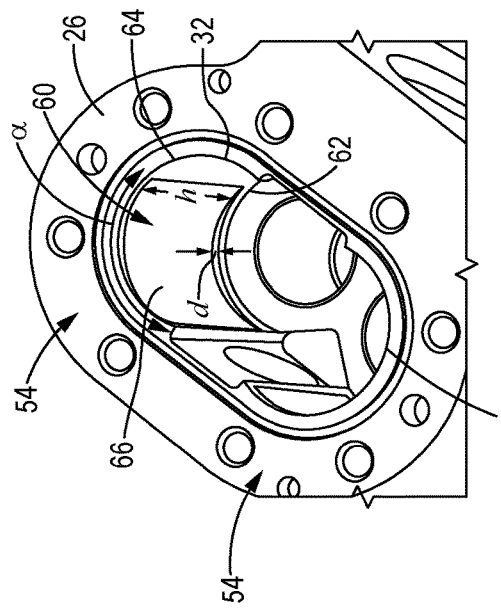
FIG. 5 is a perspective view of the cast iron part after creating a crescent-shaped pocket in the inner diameter surface of the bore to remove the worn portion, constructed in accordance with the present disclosure.

Initially, the worn portions 58 may be removed from the bores 32 and 34 by forming a crescent-shaped pocket 60 along the inner diameter surfaces 52 at the inlet sides 54 of each of the bores 32 and 34 (see FIG. 5). The crescent-shaped pocket 60 may be a crescent-shaped cut into the bore inner diameter surface 52 that removes the worn portion 58. In this regard, the crescent-shaped pocket 60 may be dimensioned so that it sufficiently encompasses and excises the worn portion 58. For instance, the crescent-shaped pocket 60 may have an angle α that spans about 90 degrees to about 120 degrees along the inlet side 54 of the inner diameter surface 52, and a height (h) through the gear pocket 30 that is large enough to span the gear 36 (or the gear 42) and the pressure plates 40. The height (h) of the crescent-shaped pocket 60 may terminate before a bottom 62 and a top 64 of the gear pocket 30. In terms of depth (d) or radial plunge into the bore inner diameter surface 52, the crescent-shaped pocket 60 may extend far enough into the inner diameter surface 52 to remove the worn portion 58. The crescent-shaped pocket 60 may have a diameter that is slightly less than the diameter of the original bore inner diameter surface 52.

Figure 6:
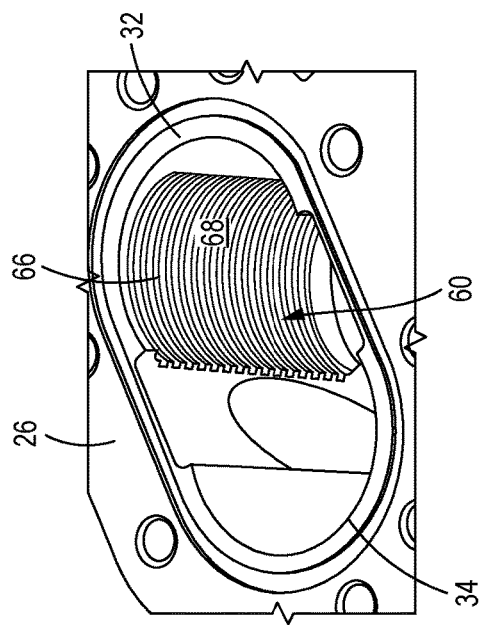
FIG. 6 is a perspective view similar to FIG. 5 but with the crescent-shaped pocket having a ribbed surface, constructed in accordance with the present disclosure.

The crescent-shaped pocket 60 may be defined by a cut bore wall 66. The bore wall 66 of the crescent-shaped pocket 60 may have a smooth surface as shown in FIG. 5, or it may have a ribbed surface 68 as shown in FIG. 6. The ribbed surface 68 may allow for the formation of a box joint or a dovetail joint, as described in further detail below. Removal of the worn portion 58 to form the crescent-shaped pocket 60 may be achieved by machining using a slot-style cutter of a known diameter, as will be understood by those with ordinary skill in the art. Specifically, the diameter of the slot-style cutter may have a diameter that is slightly less than the diameter of the original bore inner diameter surface 52. However, other types of cutters or other suitable methods for forming the crescent-shaped pocket 60 apparent to those with ordinary skill in the art may certainly be used.

Figure 7:
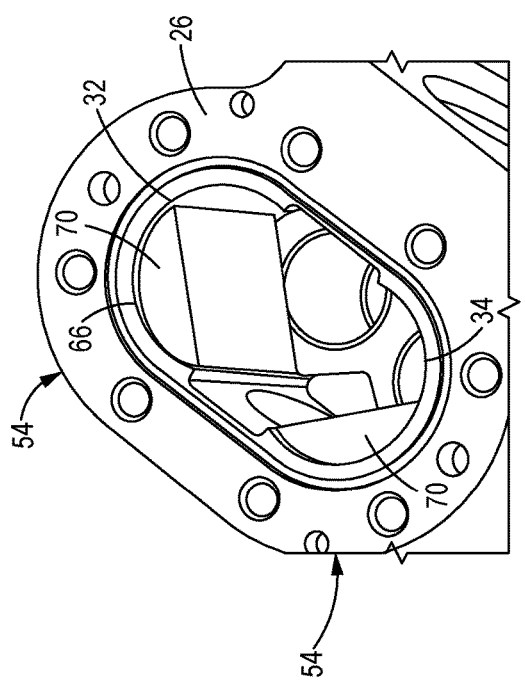
FIG. 7 is a perspective view of the cast iron part after installing an insert in the crescent-shaped pocket of the bore, constructed in accordance with the present disclosure.

Once the crescent-shaped pocket 60 is formed in each of the bores 32 and 34, an insert 70 may be installed in each of the formed pockets 60 (see FIG. 7). The insert 70 may be half-moon shaped with a diameter that corresponds to the crescent-shaped pocket 60 such that the insert forms a tight fit with the crescent-shaped pocket 60. The insert 70 may be formed from a cast iron alloy that matches the cast iron alloy of the housing 26. Alternatively, the insert 60 may be formed from other materials that complement the cast iron alloy of the housing 26 such as, but not limited to, a bronze alloy or aluminum alloy material. The inserts 60 installed in the first and second bores 32 and 34 may be cut from a common cylindrical shaft 72 having a diameter that corresponds to the diameter of the crescent-shaped pocket 60 (see FIG. 8). For instance, each of the inserts 70 may be cut along a chord 74 of the shaft 72 that is offset from the shaft center axis 76 to provide two half-moon shaped inserts 70. The chords 74 along which the inserts 70 are cut may be symmetrically disposed with respect to the center axis 76 to provide two identical inserts 70 to repair both of the bores 32 and 34. In other arrangements, however, the inserts 70 may be asymmetrically cut about the center axis 76, or alternative methods to fabricate the inserts 70, such as casting or machining, may be used.

Figure 9:
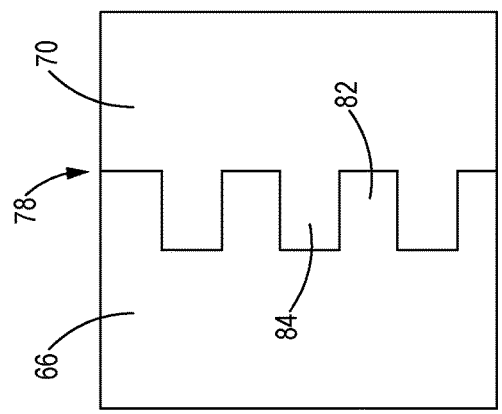
FIG. 9 is a side view of a box joint at an interface between the insert and the crescent-shaped pocket, constructed in accordance with the present disclosure.
Figure 10:
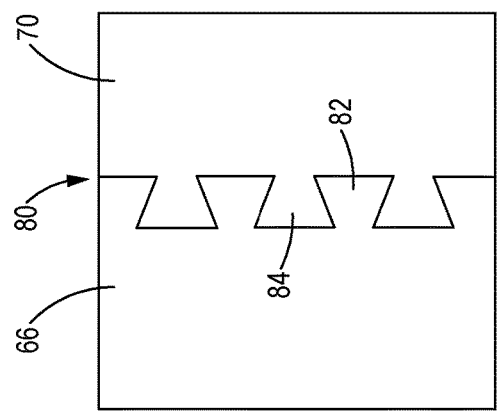
FIG. 10 is a side view of a dovetail joint at an interface between the insert and the crescent-shaped pocket, constructed in accordance with the present disclosure.

The installation of the insert 70 may involve bonding the insert 70 to the bore wall 66 that defines the crescent-shaped pocket 60 (also see FIGS. 5-6). The bonding may be achieved using a suitable epoxy adhesive such as, but not limited to, Locktite® epoxy, or other suitable adhesive resins. Alternatively, the insert 70 may be joined to the bore wall 66 of the crescent-shaped pocket 60 by brazing. To further hold the insert 70 in place or to enhance shear strength, the bond between the insert 70 and the bore wall 66 may be reinforced by a box joint 78 (see FIG. 9), or a dovetail joint 80 (see FIG. 10). In such instances, the bore wall 66 defining the crescent-shaped pocket 60 may be machined with the ribbed surface 68 having ribs 82 suitable to form the box joint 78 or the dovetail joint 80. Likewise, a bonding surface of the insert 70 may be fabricated with a ribbed surface having ribs 84 suitable to form the box joint 78 or the dovetail joint 80. In alternative arrangements, the insert 70 may be joined to the bore wall 66 using only the box joint 78 or dovetail joint 80, without an adhesive bond or brazing.

Figure 11:
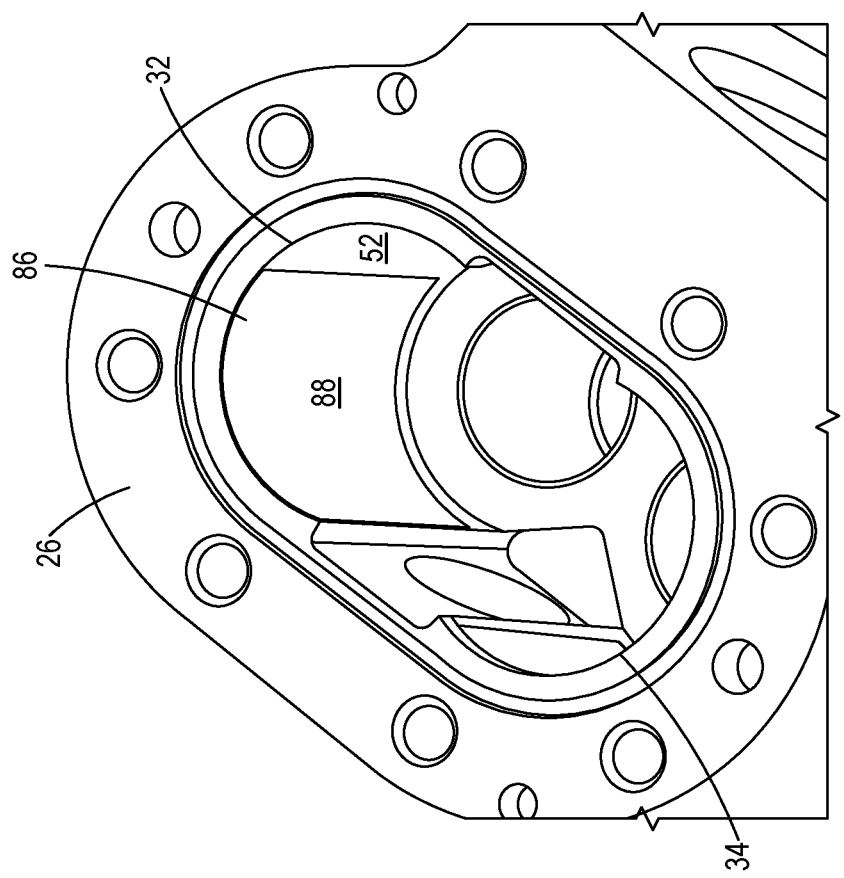
FIG. 11 is a perspective view of the cast iron part and the insert after post-machining the insert to match an original surface geometry of the bore, constructed in accordance with the present disclosure.

Turning now to FIG. 11, after installation of the insert 70 in the crescent-shaped pocket 60, the insert 70 may be post-machined to form a crescent-shaped insert 86 that is flush with the bore inner diameter surface 52. That is, an inner diameter surface 88 of the crescent-shaped insert 86 may correspond to the original surface geometry of the bore inner diameter surface 52 prior to wear. Further, if needed to provide a seamless transition between the crescent-shaped insert 86 and the surrounding areas of the bore inner diameter surface 52 that has not been repaired, the inner diameter surface 88 of the crescent-shaped insert 86 may be blended with the surrounding bore inner diameter surface 52 by machining or using a manual grinding tool. The repair method disclosed herein may be performed on each of the bores 32 and 34 of the gear pocket 30 to restore the bores 32 and 34 to their original geometry prior to wear.

The repair method disclosed herein may be applied to many other types bore inner diameter surfaces of cast iron parts aside from high-pressure gear pump housings. The method may be applicable for repair of any cast iron part having worn bore inner diameter surfaces, including cast iron parts used in applications outside of work machines.

INDUSTRIAL APPLICABILITY

In general, the teachings of the present disclosure may find applicability in many industries including, but not limited to, construction, mining, and agricultural industries. More specifically, the teachings of the present disclosure may be applicable to any industry relying on cast iron parts having bore inner diameter surfaces that are subject to wear over time.

Figure 12:
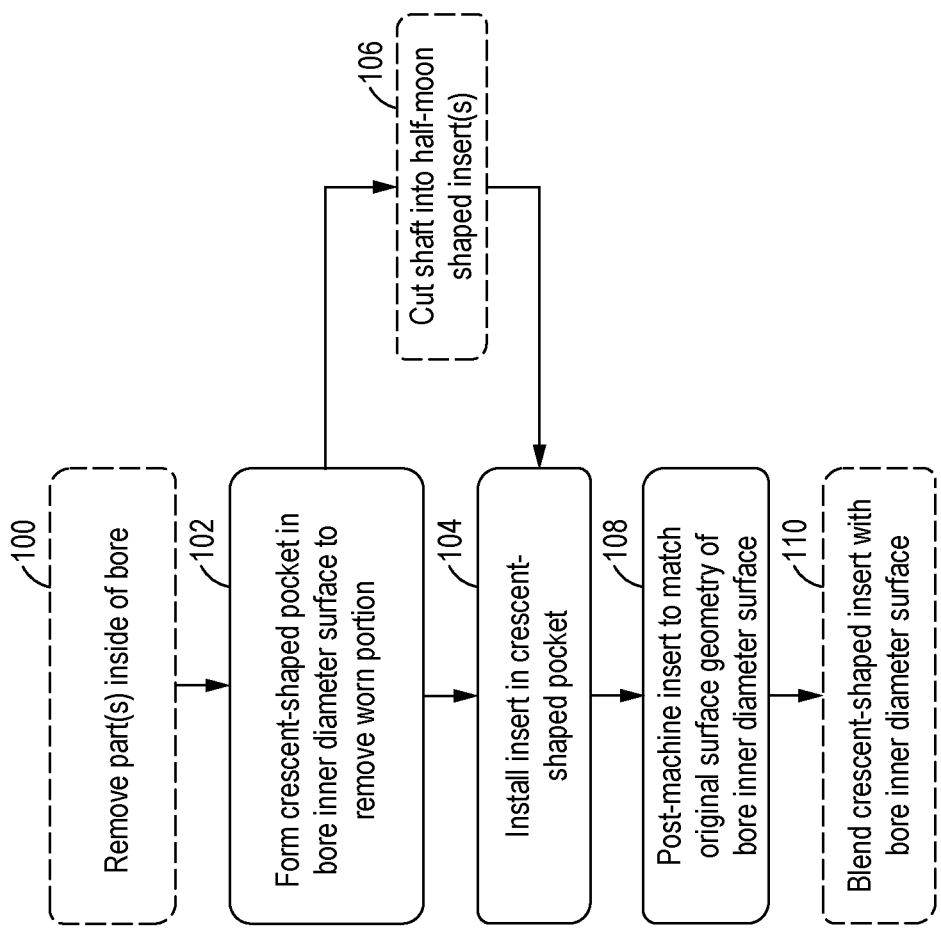
FIG. 12 is a flowchart of a series of steps that may be involved in repairing the worn portion of the bore of the cast iron part, in accordance with a method of the present disclosure.

FIG. 12 shows a series of steps that may be involved in repairing the worn portion 58 of the cast iron part 24, in accordance with a method of the present disclosure. The steps of the method will be described as applied to the exemplary cast iron housing 26 of the high-pressure gear pump 28, but it will be understood that the repair method may be adapted for repair of other types of cast iron parts having bores with worn inner diameter surfaces. According to a first block 100, any part(s) may be removed from the bores 32 and 34 of the housing 26 to expose the worn portions 58 of the inner diameter surfaces 52 that need repair. For instance, the gears 36 and 42 as well as the pressure plates 40 may be removed from the gear pocket 30 (see FIG. 4). At a next block 102, the worn portion 58 may be removed from the bore inner diameter surface 52 by forming a crescent-shaped pocket 60 that excises the worn portion 58 and extends beyond the worn portion 58 in the angular, height, and radial (or depth) dimensions (see FIGS. 5-6). The block 102 may be performed by machining using a slot-style cutter, or other suitable type of machining method or manual tool.

Figure 8:
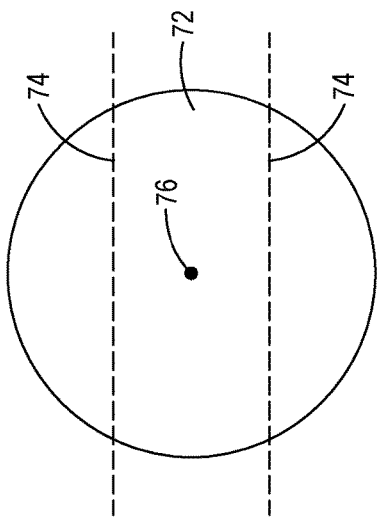
FIG. 8 is a side view of a cylindrical shaft from which one or more of the inserts are cut, constructed in accordance with the present disclosure.

At a next block 104, the insert 70 may be installed in the crescent-shaped pocket 60 by bonding using an adhesive, such as an epoxy resin, or by brazing (see FIG. 7). The strength of the connection between insert 70 and the bore wall 66 defining the crescent-shaped pocket 60 may be reinforced with the box joint 78 or the dovetail joint 80, as described above (see FIGS. 9-10). Alternatively, the insert 70 may be joined to the bore wall 66 of the crescent-shaped pocket 60 using only the box joint 78 or the dovetail joint 80, without an adhesive or brazing. As explained above, the insert 70 may be half-moon shaped as cut from a cylindrical shaft 72 (optional block 106; FIG. 8). However, the insert 70 may have alternative shapes, such as crescent shapes or circular/cylindrical shapes, and may be fabricated by other methods.

After installation of the insert 70 in the crescent-shaped pocket 60, the insert 70 may be post-machined to a crescent-shaped insert 86 that matches the original surface geometry of the bore inner diameter surface 52 prior to wear (block 108; FIG. 11). That is, the insert 70 may be machined so that the inner diameter surface 88 of the resulting crescent-shaped insert 86 is flush with the bore inner diameter surface 52. Optionally, the crescent-shaped insert 86 may be blended with surrounding areas of the bore inner diameter surface 52 according to an optional block 110 to provide a more seamless transition between the insert 86 and the surrounding bore inner diameter surface 52. The blending may be achieved using a machining or manual grinding operation. It will be understood that the repair method may be performed to repair worn portions of both of the bores 32 and 34 of the gear pocket 30.

The repair method disclosed herein may be used to restore worn cast iron bore inner diameter surfaces to their original condition. The method forms a crescent-shaped pocket in the damaged bore to excise the worn portion, and installs a repair insert in the crescent-shaped pocket. Bonding between the repair insert and the bore walls defining the crescent-shaped pocket may be achieved using adhesive bonding (or brazing) alone and/or with a mechanical joint such as a box joint or a dovetail joint. Post-machining of the installed insert so that it is flush with the surrounding bore inner diameter surface restores the bore inner diameter surface to its original surface geometry. The bonded insert may be more robust than thermal sprayed repair surfaces, and may be better suited to meet the performance requirements of certain applications, such as high-pressure gear pump applications.

What is claimed is:

1. A method for repairing a worn portion on an inner diameter surface of a bore of a cast iron housing of a high-pressure gear pump, the inner diameter surface of the bore having an original surface geometry prior to wear, the method comprising:
   forming a crescent-shaped pocket in the inner diameter surface of the bore to remove the worn portion, the inner diameter surface of the bore extending along a longitudinal direction;
   forming a plurality of inner ribs in the crescent-shaped pocket, a peak of each rib of the plurality of inner ribs extending circumferentially about the crescent-shaped pocket, adjacent ribs of the plurality of inner ribs being distributed along the longitudinal direction;
   installing an insert in the crescent-shaped pocket; and
   post-machining the insert so that an inner diameter surface of the insert corresponds to the original surface geometry of the bore inner diameter surface,
   wherein an outer surface of the insert includes a plurality of outer ribs, and
   wherein installing the insert in the crescent-shaped pocket includes interleaving the plurality of inner ribs with the plurality of outer ribs, such that the plurality of inner ribs overlaps with the plurality of outer ribs along a radial direction, the radial direction being transverse to the longitudinal direction.

2. The method of claim 1, wherein post-machining the insert comprises machining the insert to a crescent-shaped insert, and wherein the crescent-shaped insert has an inner diameter surface that corresponds to the original surface geometry of the bore inner diameter surface.

3. The method of claim 1, wherein the insert is half-moon shaped prior to post-machining the insert.

4. The method of claim 1, wherein installing the insert comprises bonding the insert to the crescent-shaped pocket using an epoxy adhesive.

5. The method of claim 1, wherein installing the insert comprises bonding the insert to the crescent-shaped pocket by brazing.

6. The method of claim 1, wherein interleaving the plurality of inner ribs with the plurality of outer ribs forms a box joint.

7. The method of claim 1, wherein interleaving the plurality of inner ribs with the plurality of outer ribs forms a dovetail joint.

8. The method of claim 1, wherein forming the crescent-shaped pocket comprises machining the crescent-shaped pocket in the inner diameter surface using a slot-style cutter.

9. The method of claim 1, wherein the insert is formed from a cast iron alloy.

10. A method for repairing a worn portion on an inner diameter surface of a bore of a high-pressure gear pump, the bore being formed in a cast iron housing of the high-pressure gear pump and being configured to receive a gear, the inner diameter surface of the bore having an original surface geometry prior to wear, the method comprising:
    forming a crescent-shaped pocket in the inner diameter surface of the bore to remove the worn portion, the inner diameter surface of the bore extending along a longitudinal direction, the crescent-shaped pocket spanning about 90 degrees to about 120 degrees circumferentially around the inner diameter surface of the bore;
    forming a plurality of inner ribs in the crescent-shaped pocket, a peak of each rib of the plurality of inner ribs extending circumferentially about the crescent-shaped pocket, adjacent ribs of the plurality of inner ribs being distributed along the longitudinal direction,
    installing an insert in the crescent-shaped pocket; and
    post-machining the insert into a crescent-shaped insert, the crescent-shaped insert having an inner diameter surface that corresponds to the original surface geometry of the bore inner diameter surface,
    wherein an outer surface of the insert includes a plurality of outer ribs, and
    wherein installing the insert in the crescent-shaped pocket includes interleaving the plurality of inner ribs with the plurality of outer ribs, such that the plurality of inner ribs overlaps with the plurality of outer ribs along a radial direction, the radial direction being transverse to the longitudinal direction.

11. The method of claim 10, further comprising blending the crescent-shaped insert with surrounding areas of the bore inner diameter surface.

12. The method of claim 10, further comprising forming the insert prior to installing the insert by cutting the insert from a cylindrical shaft such that the insert is half-moon shaped.

13. The method of claim 10, wherein the insert is formed from a cast iron alloy.

14. The method of claim 10, wherein installing the insert comprises bonding the insert to a bore wall defining the crescent-shaped pocket using an epoxy adhesive.

15. The method of claim 14, wherein interleaving the plurality of inner ribs with the plurality of outer ribs forms a box joint.

16. The method of claim 14, wherein interleaving the plurality of inner ribs with the plurality of outer ribs forms a dovetail joint.

17. The method of claim 10, wherein the housing of the high-pressure gear pump includes an inlet and an outlet, and wherein the worn portion in the inner diameter surface of the bore is oriented closer to the inlet than the outlet.

18. A method for repairing a worn portion in an inner diameter surface of a bore of a cast iron part, the inner diameter surface of the bore having an original surface geometry prior to wear, the method comprising:
   forming a crescent-shaped pocket in the inner diameter surface of the bore to remove the worn portion, the inner diameter surface of the bore extending along a longitudinal direction;
   forming a plurality of inner ribs in the crescent-shaped pocket, a peak of each rib of the plurality of inner ribs extending circumferentially about the crescent-shaped pocket, adjacent ribs of the plurality of inner ribs being distributed along the longitudinal direction;
   installing a half-moon shaped insert in the crescent-shaped pocket; and
   post-machining the half-moon shaped insert to form a crescent-shaped insert that is flush with the original surface geometry of the bore inner diameter surface,
   wherein an outer surface of the half-moon shaped insert includes a plurality of outer ribs, and
   wherein installing the half-moon shaped insert in the crescent-shaped pocket includes interleaving the plurality of inner ribs with the plurality of outer ribs, such that the plurality of inner ribs overlaps with the plurality of outer ribs along a radial direction, the radial direction being transverse to the longitudinal direction.

19. The method of claim 18, wherein installing the half-moon shaped insert comprises bonding the half-moon shaped insert to a bore wall defining the crescent-shaped pocket using an epoxy adhesive.

20. The method of claim 18, wherein interleaving the plurality of inner ribs with the plurality of outer ribs forms one of a box joint and a dovetail joint.

* * * * *